United States Patent [19]

Kim

[11] Patent Number: 4,967,131
[45] Date of Patent: Oct. 30, 1990

[54] ELECTRONIC MOTOR STARTER

[76] Inventor: In S. Kim, Rm. 101, Bldg. No. 67 Banpo APT, Banpo-Dong, Seocho-Ku, Seoul, Rep. of Korea

[21] Appl. No.: 394,202

[22] Filed: Aug. 15, 1989

[30] Foreign Application Priority Data

Aug. 16, 1988 [KR] Rep. of Korea .............. 1988-10376

[51] Int. Cl.$^5$ ........................................... H02P 1/64
[52] U.S. Cl. .................................... 318/786; 318/785; 318/789; 318/729
[58] Field of Search ............... 318/722, 723, 727, 728, 318/729, 753, 755, 756, 776, 778, 779, 780, 781, 785, 786, 787, 788, 782, 783, 793, 772, 773, 774, 775

[56] References Cited

U.S. PATENT DOCUMENTS

| | | |
|---|---|---|
| 3,882,364 | 5/1975 | Wright et al. .................... 318/786 |
| 4,047,082 | 9/1977 | Scheuer et al. .................. 318/782 |
| 4,361,792 | 11/1982 | Davis, Jr. et al. ............... 318/729 |
| 4,388,578 | 6/1983 | Green et al. ..................... 318/729 |
| 4,430,607 | 2/1984 | Muth .............................. 318/729 X |
| 4,433,276 | 2/1984 | Nola ................................ 318/729 |
| 4,453,118 | 6/1984 | Philips et al. ................... 318/786 X |
| 4,605,888 | 8/1986 | Kim ................................. 318/786 |
| 4,622,506 | 11/1986 | Shemanske et al. ............ 318/785 X |
| 4,670,697 | 6/1987 | Wrege et al. .................... 318/785 X |
| 4,683,413 | 7/1987 | Bax ................................. 318/779 |
| 4,804,901 | 2/1989 | Pertessis et al. ................ 318/785 X |
| 4,806,838 | 2/1989 | Weber ............................. 318/729 |
| 4,862,053 | 8/1989 | Jordan et al. ................... 318/786 |

Primary Examiner—William M. Shoop, Jr.
Assistant Examiner—Paul Ip
Attorney, Agent, or Firm—Michael N. Meller

[57] ABSTRACT

An electronic motor starter for use with a single-phase induction motor in which the hysterisis width can be adjusted in the range of 75 volts by providing for the control of a positive feedback characteristic of NAND gates and a strength of input signal. The motor starter according to the present invention utilizes an induced voltage across the starting winding of a motor to start the motor and maintains a steady operation thereof.

8 Claims, 3 Drawing Sheets

ELECTRONIC MOTOR STARTER

BACKGROUND OF THE INVENTION

This invention relates to electronic motors, and particularly to electronic motor starters or voltage type electronic relays for starting the single-phase induction motors which substitute for conventional centrifugal switches, mechanical voltage relays and current type starting relays.

A voltage type electronic relay for starting a single-phase induction motor is disclosed in U.S. Pat. No. 4,605,888, in which an electronic avalanche type transistor is used. The electronic relay of U.S. Pat. No. 4,605,888 has a drawback in that the time constant must be reestablished as the amplifying degree of the avalanche transistor and the avalanche voltage vary for each production lot of the transistors. The relay also has the disadvantage that it cannot maintain a steady motor starting function where the line voltage variation is great, making the voltage compensation impossible because the relay has only about a 30 volt hysteresis width.

SUMMARY OF THE INVENTION

It is not an object of the present invention to provide a semi-permanent electronic motor starter for use with a single-phase induction motor in which the hysteresis width can be adjusted in the unprecedented range of 75 volts which is greater than half the power voltage by providing for the control of the positive feedback characteristic of NAND gates and a strength of input signal, thereby achieving an excellent starting characteristic as well as a superior productivity. In addition, the motor starter produces no arc and is semi-permanent.

DETAILED DESCRIPTION OF THE INVENTION

Figure 1:
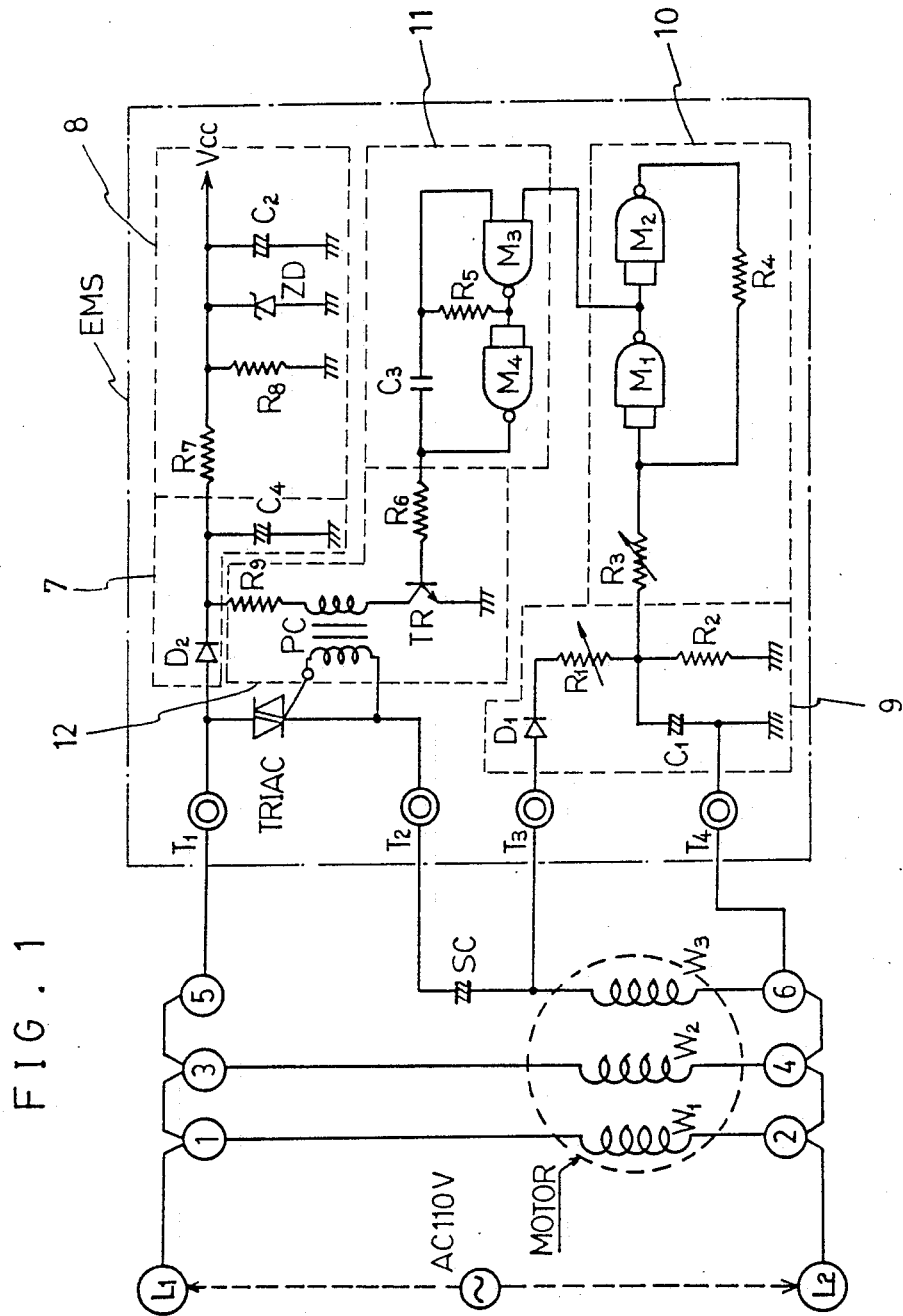
FIG. 1 shows the preferred embodiment of the electronic motor starter according to the present invention.

Referring to FIG. 1, the electronic motor starter EMS has terminals T1 and T4 connected to an AC voltage source. The AC voltage applied to the terminal T1 is first rectified at a rectifier circuit 7 comprised of a diode D2 and a filter capacitor C4 and then supplied via resistor R9 to a secondary winding of a pick-up coil PC for triggering the gate of a triac connected between terminals T1 and T2. The rectified voltage is also applied to a gate powering circuit 8 where it is set by distribution resistors R7 and R8, and passed through a filter capacitor C2 to provide a source voltage Vcc for the NAND gates M3 and M4 of oscillator circuit 11 and M3 and M4 of hysterisis adjusting circuit 10, which will be described hereinafter. The gate powering circuit 8 includes a zener diode ZD connected in parallel to the resistor R8 to prevent the overvoltage of the power supply.

The terminal T2 is connected to a starting winding W3 of a single-phase induction motor via a starting capacitor SC, and the starting winding W3 is in turn connected to the terminal T4 and to a power source input L2. A terminal T3 is connected to the junction between the starting capacitor SC and the starting winding W3. Across the starting winding W3, the terminals T3 and T4 are connected to a voltage detection circuit 9 which is comprised of a diode D1, resistors R1 and R2 series connected to the diode D1, and a capacitor C1 connected to the junction of the resistors R1 and R2. The voltage detection circuit 9 receives and filters signal voltages applied thereto and provides an output via a hysteresis width adjusting resistor R3 to the input of the NAND gate M1, which comprises with the NAND gate M2 the hysteresis width adjusting circuit 10. The output of the NAND gate M2 is positive fed back through a resistor R4 to the input of NAND gate M1 to increase the hysteresis width.

The output of NAND gate M1 is applied to one input of the NAND gate M3, which is included in the oscillator circuit 11 and connected with the NAND gate M4, the output of NAND gate M4 being negative fed back through a capacitor C3 and a resistor R5. The output of the oscillator circuit is connected through a current-limiting resistor R6 to the base of a transistor TR having a collector connected to the secondary winding of the pick-up coil PC and an emitter connected to ground.

Figure 2:
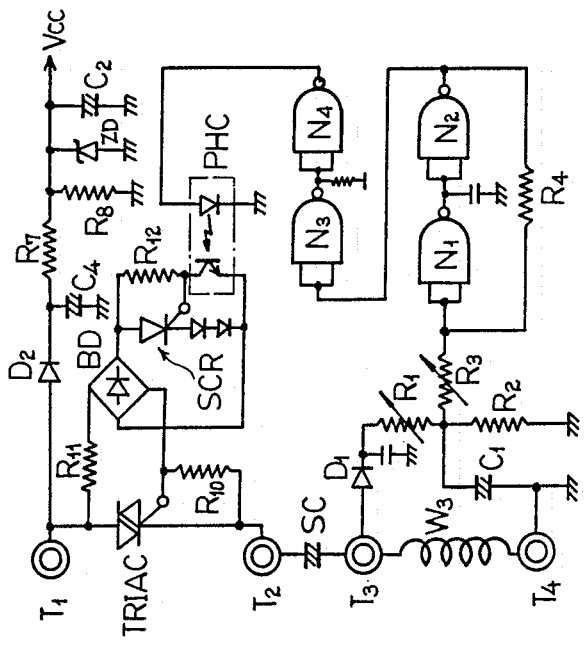
FIG. 2 shows another embodiment of the invention using NOT gates.

Referring to FIG. 2, another embodiment of the electronic motor starter according to the present invention is shown. This embodiment differs from the previous embodiment in that NAND gates M1, M2, M3 and M4 are replaced by Schmitt NOT gates G1, G2, G3 and G4 so that the hysteresis adjusting circuit has a broader hysteresis width, and in that the oscillator circuit comprises diode D3, capacitor C3, and inverter G3 which are connected to each other so as to be fed back through a resistor R5.

Figure 3:
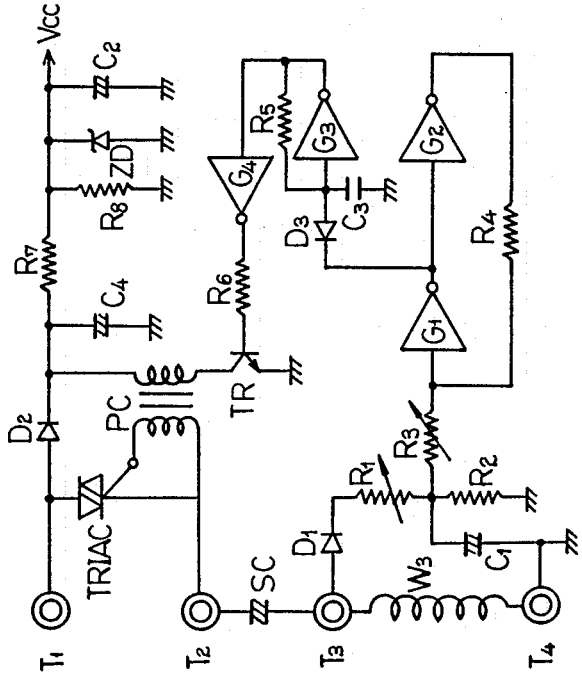
FIG. 3 shows another embodiment of the present invention using NAND gates and a photocoupler.

Referring to FIG. 3, another embodiment of the electronic motor starter according to the present invention is shown. This embodiment differs from the first embodiment in the method of triggering the triac. The first and second AC terminals of a diode bridge BD are connected to the AC terminal T1 through resistor R11 and to the triac's gate terminal. The triac's gate terminal is also connected to terminal T2 through resistor R10. A photocoupler is connected between the first and second DC terminals of the diode bridge with resistor R12 in series. A thyristor SCR is connected in parallel with the photocoupler between both DC terminals of the diode bridge with its gate terminal connected to the collector terminal of the light receiving transistor. The light emitting diode of the photocoupler is connected to the output of NAND gate N4 with its cathode terminal grounded.

Figure 4:
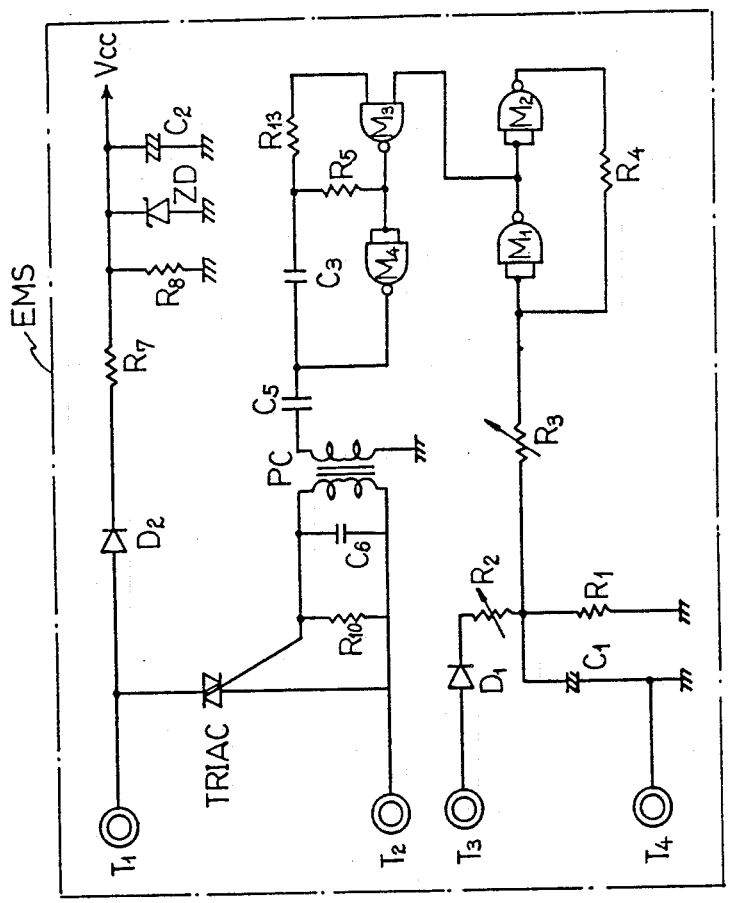
FIG. 4 shows a further embodiment of the present invention.

In FIG. 4, another embodiment of the electronic motor starter is shown. This embodiment differs from the first embodiment only in that resistor R10 and capacitor C6 in parallel to each other are connected between the triac's gate terminal and the triac's cathode terminal in parallel with the primary pick-up coil, and that one terminal of the secondary pick-up coil is connected through capacitor C5 to the output of NAND gate M4 with its other terminal grounded. At start-up in this embodiment, the high frequency output of NAND gate M4 is directly applied through coupling capacitor C5 to the secondary pick-up coil. The induced voltage across the primary pick-up coil triggers the triac.

The single-phase induction motors generally comprise operating windings W1 and W2 and starting winding W3, which conducts when the motor is started to provide a starting torque and then returns to the off state during the operation of the motor. The device which turns on the starting winding before the start of the motor and thereafter turns it off is called a centrifugal switch or starting relay. The switch that turns the starting winding on and off by the centrifugal device moving in proportion to the motor speed is called a centrifugal switch or governor switch.

The present electronic motor starter employs an induced voltage across the starting winding as a signal voltage for controlling the on/off state of the starting winding based upon the proportion characteristic between the motor speed and the starting winding voltage.

The embodiment of FIG. 1 is applied in the most common 110 V/220 V capacitor-start induction motor having primary windings W1 and W2, primary winding terminals 1-4, and starting winding terminals 5 and 6, which are connected to the motor starter terminals T1 and T2, respectively. The source voltage, for example, AC 110 volts, is fed into the terminal T1 which leads to the triac, terminal T2, starting capacitor SC, starting winding W3, and terminal T4 and returns to the source terminals L1 and L2.

Accordingly, when the source voltage is supplied it is distributed through the series starting capacitor SC and starting winding W3 on the basis of their reactance ratio. A voltage across the starting winding W3 is applied to the voltage detection circuit 9. A voltage rectified from diode D1 is distributed by the variable resistor R1 and the fixed resistor R2. A half-wave voltage presented across resistor R2 is filtered by capacitor C1 and then applied to the hysteresis adjusting circuit 10. The NAND gates M1 receives the filtered half-wave voltage through variable resistor R3 which controls the hysteresis width.

At start-up, the voltage across resistor R2 is low so that a low level signal is applied to the input of NAND gate M1. Accordingly, NAND gate M1 outputs a high level signal which activates the oscillator circuit 11, which in turn controls the transistor TR through resistor R6 of the trigger circuit 12 so that a pulse signal is generated from the pick-up coil PC. The pulse signal is applied to the triac's gate so as to turn on the triac. This supplies the starting winding W3 with an electric current to start the motor and to increase the motor speed.

When the motor reaches a first predetermined speed, e.g. about 70% of synchronous speed with the supply voltage of 110 volts, the induced voltage across the starting winding may be raised to about 125 volts. Once the voltage detection circuit 9 detects such an induced voltage increase, it produces a high level signal to the input of NAND gate M1 through variable resistor R3 for controlling the hysteresis width. Accordingly, NAND gate M1 outputs a low level signal to the oscillator circuit 11, which then stops oscillating thereby turning off the triac. Thereafter, the starting winding is electrically disconnected from the motor's circuitry, allowing a normal operation of the motor. Although the starting winding is effectively removed, the starting torque initially produced allows the motor to reach synchronous speed by the flux created in the main winding.

In normal operation, the output of the NAND gate M1 remains low as well as the input to NAND gate M2 so that the output of the NAND gate M2 becomes high and is fed back to the NAND gate M1 input, resulting in an electrical latch state of the hysteresis circuit.

If the motor is subjected to an overload condition wherein the rotor is locked against rotation, the starting winding will be returned to its former condition in which it is supplied with about 50 volts by the source voltage only. The voltage decrease across the starting winding W3 in turn decreases the voltage across the resistor R2, causing the input of NAND gate M1 to become low. This releases the latch state of the hysteresis circuit 10 and the NAND gate M1 produces a high signal which operates the oscillator circuit 11 to turn the triac on, starting the motor again. Thus, the electronic motor starter of the present invention provides steady operation of the motor even where voltage variation is great because it has a broad hysteresis width on the order of 75 volts between 50 to 125 volts, as described above.

The power circuit of the motor starter will be described in detail hereinafter. The power circuit has rectifying section 7 which is connected to the motor power source to produce a rectified half-wave voltage for activating the pick-up coil PC. When activated, the pick-up coil PC generates a pulse to trigger the triac. The power circuit further comprises the gate powering section 8 which is connected to the rectifying section 7 and is fed therefrom to provide a steady voltage source for each gate. The preferred zener diode ZD of the gate powering section 8 has its rated voltage of 15 volts which is much greater than the gate source voltage. The zener diode ZD serves as an arrester which assures that the source voltage Vcc for each gate be limited to 15 volts when an overvoltage is introduced from the motor power source.

When the resistances of the distribution resistors R7 and R8 are chosen so that the source voltage for each gate normally becomes 6 volts, the reference input voltage to the NAND gate M1 of the hysteresis circuit 10 may be varied as well as the gate feeding voltage which is proportional to the possible supply voltage fluctuations, and therefore a voltage compensation is achieved.

The embodiment of FIG. 2 is similar to that of FIG. 1 except that the hysteresis adjusting circuit and the oscillator circuit are comprised of a Schmitt circuit having NOT gates instead of NAND gates, and therefore the description of the operation will not be given again.

The embodiment of FIG. 3 similarly comprises the voltage detection circuit, the discriminator, the feedback circuit and the hysteresis adjusting circuit but it has a triggering circuit having a photocoupler, thyrister, and diode bridge which in combination trigger the triac when the motor starts.

When the motor reaches a predetermined speed and the induced voltage across the starting winding is increased, the combination of NAND gates N1 to N4 produces a high signal to operate the photocoupler PHC. The photocoupler then turns the thyrister off, causing the triac to be turned off to disconnect the current from the starting winding. Then the motor operates normally.

The embodiment of FIG. 3 also includes to diodes connected to the cathode of the thyrister SCR for improving the off characteristic of the thyrister, a resistor connected between the NAND gates N3 and N4 for providing greater stability when the gates change their outputs, a capacitor connected between the diode D1 and the resistor R1 for preventing any adverse effect due to the noise introduced when the motor starts, and a filter capacitor connected between the NAND gates N1 and N2 for stabilizing the signal input voltage.

In the embodiment of FIG. 4, the triac is triggered in another manner in which the high frequency output of the NAND gate M4 is fed through a coupling capacitor C5 into the primary pick-up coil and a transformed high frequency signal of lower voltage at the secondary pick-up coil is supplied to a capacitor C6 and a resistor R10 connected in parallel between the secondary coil and the triac thereby triggering the triac. This embodiment eliminates the transistor TR, resistor R9, and capacitor C4 used in the first embodiment for the simplification of the starter circuit.

As described above, the present invention provides an electronic motor starter having an excellent starting characteristic wherein the hysteresis width may be adjusted over a range of 75 volts, which is greater than half the power voltage, by providing for the control of a positive feedback characteristic of NAND gates and a strength of the input signal, thereby allowing a safe operation of the starter specifically in a poor power source facility with large voltage fluctuations.

What is claimed is:

1. An electronic motor starter for use with a single-phase induction motor having a starting winding comprising:
   a triac having a first terminal connected to a motor power source, a second terminal connected to the starting winding, and a gate terminal;
   a rectifying means (7) including a first diode (D2) connected to the first terminal of the triac and a first capacitor (C4) for rectifying the power source;
   a gate powering means (8) having first and second distribution resistors (R7) and (R8) connected to the rectifying means, a Zener diode (ZD) and a first filter capacitor (C2) each connected in parallel to the second distribution resistor (R8) to supply a gate powering voltage;
   a signal voltage detecting means (9) across the starting winding having a second diode (D1), third and fourth distribution resistors (R1 and R2), and a second filter capacitor (C1);
   a hysteresis adjusting means (10) including a hysteresis adjusting resistor (R3) connected to the junction of the third distribution hysteresis adjusting resistors (R1 and R3), first and second NAND gates M1 and M2 and a feedback resistor (R4);
   an oscillating means (11) connected between the first and second NAND gates (M1 and M2) including third and fourth NAND gates (M3 and M4), a first resistor (R5), and a second capacitor (C3); and
   a trigger means (12) comprised of a second resistor (R6) connected to the output of a fourth NAND gate (M4), a transistor (TR) having a base terminal connected to the second resistor (R6), an emitter terminal connected to ground and a collecter terminal, and a pick-up coil (PC) connected among the emitter terminal of the transistor (TR), the rectifying means (7) and the gate terminal of the triac, whereby the pickup coil (PC) initially activates the triac to electrically connect the starting winding until an induced voltage across the winding reaches a predetermined value and thereafter deactivates the triac to disconnect the starting winding from the motor circuitry allowing a normal operation of the motor.

2. An electronic motor starter for use with a single-phase induction motor having a starting winding comprising:
   a triac having a first terminal connected to a motor power source, a second terminal connected to the starting winding, and a gate terminal;
   rectifying means connected to the first terminal of the triac for rectifying the power source;
   means connected to the rectifying means for supplying a gate powering voltage;
   means for detecting a signal voltage across the starting winding, said signal voltage detecting means having an output;
   means for adjusting the hysteresis width comprising a hysteresis adjusting resistor coupled to the output of said signal voltage detecting means, first and second gates connected in series and a feedback resistor connected between an output of said second gate and an input of said first gate;
   oscillating means comprising third and fourth gates connected in series, an input of said third gate being coupled to a junction between said first and second gates;
   means connected to an output of the fourth gate for triggering the gate terminal of said triac,
   whereby the triggering means initially activates the triac to electrically connect the starting winding until an induced voltage across the winding detected by said signal voltage detecting means reaches a predetermined value and thereafter the triggering means deactivates the triac to disconnect the starting winding from the motor circuitry, allowing a normal operation of the motor.

3. The electronic motor starter as defined in claim 2, wherein each of said gates is a NAND gate.

4. The electronic motor starter as defined in claim 2, wherein each of said gates is a Schmitt NOT gate.

5. The electronic motor starter as defined in claim 2 wherein said triggering means comprises a pick-up coil connected to the gate terminal of said triac.

6. The electronic motor starter as defined in claim 5, wherein said triggering means further comprises a transistor having a base terminal coupled to the output of said fourth gate by way of a resistor, an emitter terminal connected to ground, and a collector terminal connector to a secondary winding of said pick-up coil.

7. The electronic motor starter as defined in claim 5, wherein said triggering means further comprises a resistor and a capacitor connected in series with a primary winding of said pick-up coil across said second terminal and said gate terminal of said triac.

8. The electronic motor starter as defined in claim 2, wherein said triggering means comprises a diode bridge having a first terminal coupled by a first resistor to said first terminal of said triac and a second terminal coupled to said gate terminal of said triac, a light receiving transistor of a photo coupler connected in series with a second resistor across third and fourth terminals of said diode bridge, a light emitting diode of said photocopier being coupled to the output of said fourth gate, and a thyristor connected in parallel with said light receiving transistor across said third and fourth terminals of said diode bridge, said thyristor having a gate terminal connected to the collector terminal of said light-receiving transistor.

* * * * *